(12) United States Patent
Choi et al.

(10) Patent No.: US 8,885,104 B2
(45) Date of Patent: Nov. 11, 2014

(54) APPARATUS AND METHOD FOR GENERATING VIDEO SIGNAL REDUCING CROSSTALK BETWEEN LIGHTNESS SIGNAL AND CHROMINANCE SIGNAL

(75) Inventors: Seo Young Choi, Seoul (KR); Du-Sik Park, Suwon-si (KR); Ho Young Lee, Suwon-si (KR); Balazs Kranicz, Veszprem (HU); Janos Schanda, Veszprem (HU); Ji Young Hong, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 505 days.

(21) Appl. No.: 13/137,290

(22) Filed: Aug. 3, 2011

(65) Prior Publication Data

US 2012/0038828 A1 Feb. 16, 2012

(30) Foreign Application Priority Data

Aug. 10, 2010 (KR) .......................... 10-2010-0076997

(51) Int. Cl.
*H04N 5/00* (2011.01)
*H04N 9/67* (2006.01)
*H04N 9/64* (2006.01)

(52) U.S. Cl.
CPC ............ *H04N 9/67* (2013.01); *H04N 9/646* (2013.01); *H04N 9/64* (2013.01)
USPC ........................................................ 348/624

(58) Field of Classification Search
CPC ............ H04N 9/64; H04N 9/646; H04N 9/67
See application file for complete search history.

(56) References Cited

U.S. PATENT DOCUMENTS

| | | | |
|---|---|---|---|
| 5,276,779 A | 1/1994 | Statt | |
| 5,740,303 A * | 4/1998 | Ban | 386/225 |
| 6,977,662 B2 * | 12/2005 | Sharman | 345/589 |
| 7,120,295 B2 | 10/2006 | Edge et al. | |
| 7,313,273 B2 * | 12/2007 | Hu | 382/167 |
| 2005/0237550 A1 | 10/2005 | Hu | |
| 2006/0038827 A1 | 2/2006 | Hu | |
| 2007/0013714 A1 | 1/2007 | Hu | |
| 2008/0024513 A1 * | 1/2008 | Raveendran | 345/589 |
| 2009/0257648 A1 | 10/2009 | Edge | |
| 2011/0305391 A1 * | 12/2011 | Kunkel et al. | 382/167 |

FOREIGN PATENT DOCUMENTS

| | | | | |
|---|---|---|---|---|
| EP | 1947609 A1 * | 7/2008 | | G06T 9/00 |
| JP | 2000-40140 | 2/2000 | | |
| JP | 2001-320727 | 11/2001 | | |

(Continued)

OTHER PUBLICATIONS

Array from http://www.cs.utsa.edu/~cs1063/lectures/ch07.html.*

(Continued)

*Primary Examiner* — Kee M Tung
*Assistant Examiner* — Frank Chen
(74) *Attorney, Agent, or Firm* — Staas & Halsey LLP

(57) ABSTRACT

In apparatus and method for generating a video signal using an LMS cone signal and an apparatus and method for restoring a video signal, a lightness signal and a chrominance signal may be generated using the LMS cone signal generated from an input image. Therefore, the generated chrominance signal may include only lightness information while the chrominance signal includes only chrominance information.

25 Claims, 9 Drawing Sheets
(1 of 9 Drawing Sheet(s) Filed in Color)

(56) References Cited

FOREIGN PATENT DOCUMENTS

| | | |
|---|---|---|
| KR | 2001-0030121 | 4/2001 |
| KR | 10-0378637 | 3/2003 |
| KR | 10-2004-0008004 | 1/2004 |
| KR | 10-0510819 | 8/2005 |
| KR | 10-2006-0118827 | 11/2006 |
| KR | 10-2007-0051554 | 5/2007 |

OTHER PUBLICATIONS

Linear Algebra From the Beginning, Eric A Carlen and Maria C. Carvalho, © 2007 ISBN-13: 9780717648946.*

Andrew Stockman et al., "The spectral sensitivities of the middle- and long-wavelength-sensitive cones derived from measurements in observers of known genotype", Vision Research 40 (2000) pp. 1711-1737.

* cited by examiner

FIG. 5
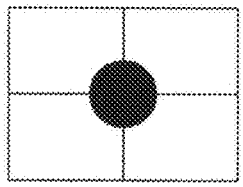
4:2:0 CHROMINANCE SIGNAL SUB-SAMPLING(510)
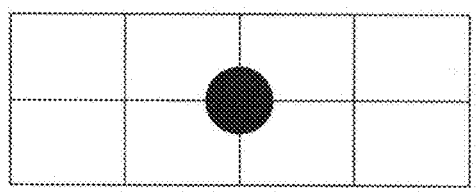
4:1:0 CHROMINANCE SIGNAL SUB-SAMPLING(520)
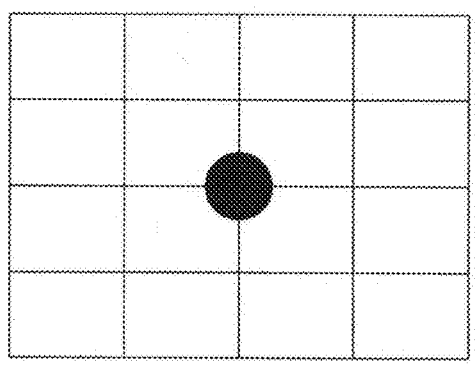
16:1:0 CHROMINANCE SIGNAL SUB-SAMPLING(530)

APPARATUS AND METHOD FOR GENERATING VIDEO SIGNAL REDUCING CROSSTALK BETWEEN LIGHTNESS SIGNAL AND CHROMINANCE SIGNAL

CROSS-REFERENCE TO RELATED APPLICATIONS

This application claims the priority benefit under 35 U.S.C. §119(a) of Korean Patent Application No. 10-2010-0076997, filed on Aug. 10, 2010, in the Korean Intellectual Property Office, the entire disclosure of which is incorporated herein by reference.

BACKGROUND

1. Field

The following description relates to an apparatus and a method for reducing crosstalk induced due to chrominance information included in a lightness signal and lightness information included in a chrominance signal.

2. Description of the Related Art

A lightness signal indicates lightness of an achromatic component. A chrominance signal indicates relative amounts of a yellow-blue chromatic component and a red-green chromatic component. The lightness signal includes chrominance information while the chrominance signal includes lightness information. Therefore, crosstalk exists between the chrominance signal and the lightness signal. The crosstalk is caused by the following reasons.

For one reason, a lightness mixture ratio of primary red green blue (RGB) colors necessary for creating the color white having a specific color temperature is to be applied to a linear RGB signal. However, since the lightness mixture ratio is applied to a nonlinear RGB signal and the lightness signal includes the nonlinear RGB signals, the crosstalk is caused between the chrominance signal and the lightness signal.

For another reason, the chrominance signal is generated using a difference between the lightness signal includes the nonlinear RGB signals and the nonlinear RGB signal.

In other words, two colors having the same lightness may have different lightness signals. Such inconsistency between the lightness and an actual amount of the lightness signals is color-dependent. Therefore, when an image including the lightness signal and the chrominance signal is sub-sampled, the sub-sampled image may be deteriorated.

Accordingly, there is a demand for technology for reducing the crosstalk between the lightness signal and the chrominance signal.

SUMMARY

In one general aspect, a video signal generation apparatus includes a signal separation unit to separate a long medium short (LMS) cone signal from an input image; a lightness signal generation unit to generate a lightness signal using the separated LMS cone signal; and a chrominance signal generation unit to generate a chrominance signal using the separated LMS cone signal.

The video signal generation apparatus may further include a signal conversion unit to convert the separated LMS cone signal into a nonlinear LMS cone signal.

The lightness signal generation unit may generate the lightness signal by combining an L signal, an M signal, and an S signal constituting the nonlinear LMS cone signal.

The chrominance signal generation unit generates the chrominance signal by separating the nonlinear LMS cone signal such that at least one of the L signal, the M signal, and the S signal of the nonlinear LMS cone signal has a different sign from the others.

The lightness signal generation unit may generate the lightness signal including only lightness information or including the lightness information and chrominance information which has an approximate value of 0, using the nonlinear LMS cone signal.

The chrominance signal generation unit may generate the chrominance signal including only chrominance information or including the chrominance information and lightness information which has an approximate value of 0, using the nonlinear LMS cone signal.

The chrominance signal generation unit may generate the chrominance signal such that a correlation between the lightness signal and the chrominance signal generated is smaller than a predetermined reference value.

The video signal generation apparatus may further include a sub-sampling unit to sub-sample the generated chrominance signal.

The video signal generation apparatus may further include a compression unit to compress the sub-sampled chrominance signal and the generated lightness signal.

In another general aspect, a video signal generation method includes separating an LMS cone signal from an input image; generating a lightness signal using the separated LMS cone signal; and generating a chrominance signal using the separated LMS cone signal.

The video signal generation method may further include converting the separated LMS cone signal into a nonlinear LMS cone signal.

The video signal generation method may further include sub-sampling the generated chrominance signal.

The video signal generation method may further include compressing the sub-sampled chrominance signal and the generated lightness signal.

In still another general aspect, a video signal restoration apparatus includes a up-sampling unit to restore a chrominance signal by up-sampling a sub-sampled chrominance signal; a signal generation unit to generate an LMS cone signal using the restored chrominance signal and a lightness signal; and an image restoration unit to restore the input image using the LMS cone signal.

The video signal restoration apparatus may further include a signal conversion unit to convert the generated nonlinear LMS cone signal into a linear LMS cone signal using the restored chrominance signal and the lightness signal, and the image restoration unit may restore the input image using the linear LMS cone signal.

The video signal restoration apparatus may further include a decompression unit to decompress a compressed signal of the sub-sampled chrominance signal and the lightness signal, and the up-sampling unit may restore the chrominance signal by up-sampling the decompressed chrominance signal.

The sub-sampled chrominance signal may include only chrominance information or includes the chrominance information and lightness information having an approximate value of 0, and the lightness signal may include only lightness information or includes the lightness information and chrominance information having an approximate value of 0.

In a further general aspect, a video signal restoration method includes restoring a chrominance signal by up-sampling a sampled chrominance signal; generating an LMS cone signal using the restored chrominance signal and a lightness signal; and restoring an input image using the LMS cone signal.

The video signal restoration method may further include converting, into a linear LMS cone signal, a nonlinear LMS cone signal generated using the restored chrominance signal and the lightness signal.

The video signal restoration method may further include decompressing a compressed signal of the sub-sampled chrominance signal and the lightness signal.

Additional aspects and/or advantages will be set forth in part in the description which follows and, in part, will be apparent from the description, or may be learned by practice of the invention.

According to embodiments, it is possible to generate a lightness signal including lightness information and a chrominance signal including chrominance information using a long medium short (LMS) cone signal.

Since a video signal is generated using the LMS cone signal, crosstalk between the lightness signal and the chrominance signal may be reduced.

Deterioration in a sub-sampled image may be reduced by sub-sampling the chrominance signal generated using the LMS cone signal.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects and advantages will become apparent and more readily appreciated from the following description of the example embodiments, taken in conjunction with the accompanying drawings of which:

FIG. 5 is a diagram illustrating a process of sub-sampling a chrominance signal, according to an embodiment.

Figure 1:
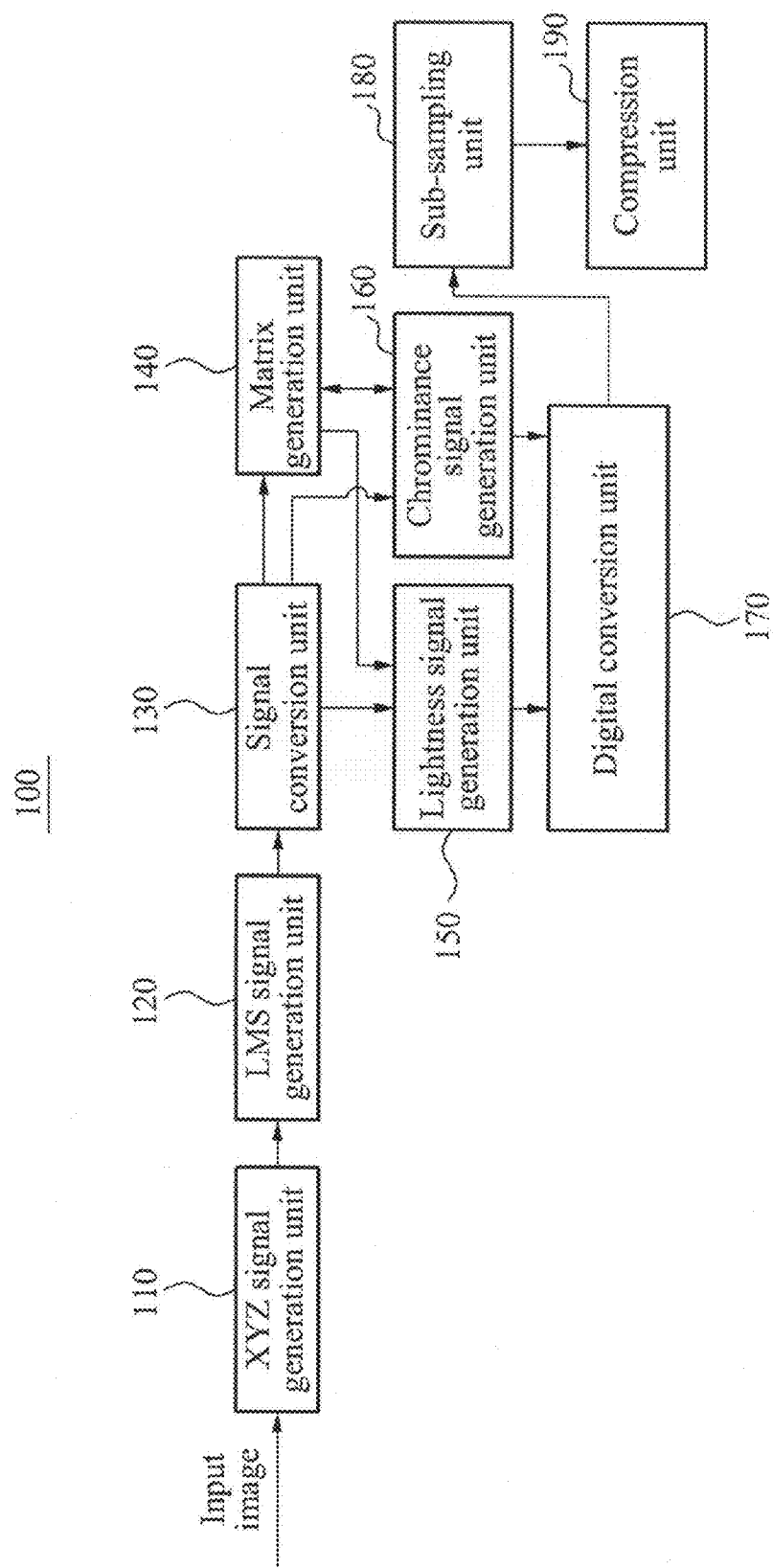
FIG. 1 is a block diagram illustrating a video signal generation apparatus according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing functions and/or operations described is an example; however, the sequence of functions and/or operations is not limited to that set forth herein and may be changed as is known in the art, with the exception of functions and/or operations necessarily occurring in a certain order. Also, description of well-known functions and constructions may be omitted for increased clarity and conciseness.

FIG. 1 is a block diagram illustrating a video signal generation apparatus 100 according to an embodiment.

Referring to FIG. 1, the video signal generation apparatus 100 may include an XYZ signal generation unit 110, a signal separation unit 120, a signal conversion unit 130, a matrix generation unit 140, a lightness signal generation unit 150, a chrominance signal generation unit 160, a digital conversion unit 170, a sub-sampling unit 180, and a compression unit 190.

The XYZ signal generation unit 110 may generate an XYZ signal based on a red green blue (RGB) value of an input image. For example, the XYZ signal generation unit 110 may convert the RGB value of the input image into the XYZ signal according to 1931 Commission Internationale de l'Eclairage (CIE) color matching functions.

The XYZ signal generation unit 110 may generate an XrYrZr signal by normalizing the XYZ signal. For example, when XYZ($\alpha$, $\beta$, $\gamma$) of white D65 is used as the XYZ signal, the XYZ signal generation unit 110 may generate the XrYrZr signal by normalizing the XYZ signal using Equation 1 below, wherein $\alpha$ may be 95.04, $\beta$ may be 100.00, and $\gamma$ may be 108.88.

$$X_r = X/\alpha$$

$$Y_r = Y/\beta$$

$$Z_r = Z/\gamma \quad \text{[Equation 1]}$$

Figure 3:
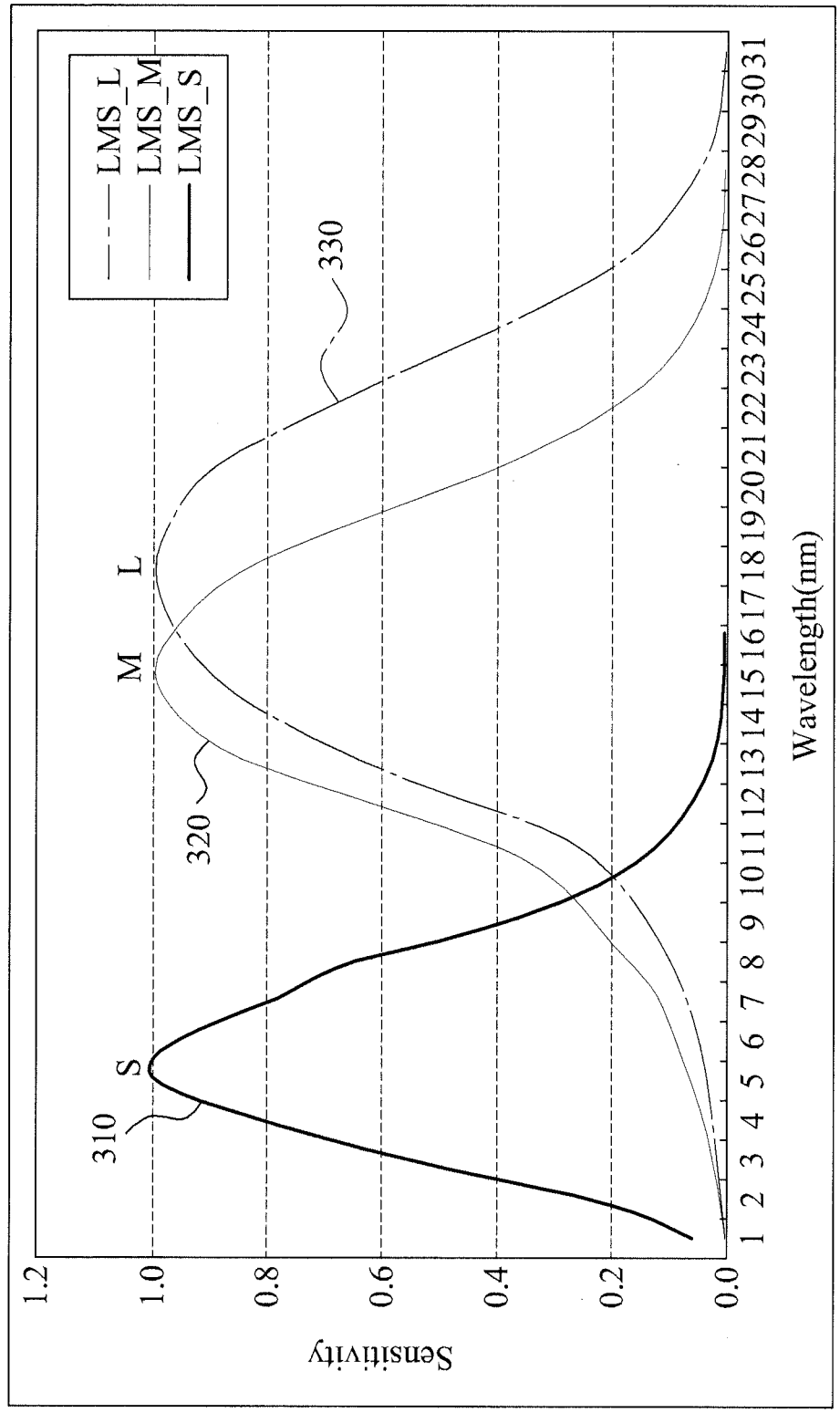
FIG. 3 is a diagram illustrating sensitivity according to wavelengths of a long medium short (LMS) cone signal.

The LMS signal generation unit 120 may generate a long medium short (LMS) cone signal from the XrYrZr signal. Referring to FIG. 3, the LMS cone signal may include a long (L) signal 310 in a long wavelength range, a medium (M) signal 320 in a medium wavelength range, and a short (S) signal 330 in a short wavelength range. For example, the LMS signal generation unit 120 may generate the LMS cone signal using an LMS generation matrix and an XrYrZr signal. The LMS generation matrix makes the LMS cone signal have a signal value of 1. The LMS generation matrix may be acquired using various well-known schemes that measure sensitivities respective to wavelength of signals.

For example, the LMS signal generation unit 120 may generate the LMS cone signal by Equation 2 and Equation 3 as follows.

$$\begin{bmatrix} L_r \\ M_r \\ S_r \end{bmatrix} = \begin{bmatrix} 0.2985 & 0.7699 & -0.0691 \\ -0.3397 & 1.1238 & 0.0478 \\ 0.0002 & 0.0003 & 0.4931 \end{bmatrix} \begin{bmatrix} X_r \\ Y_r \\ Z_r \end{bmatrix} \quad \text{[Equation 2]}$$

-continued $$L_r = \frac{L}{0.9993}$$ [Equation 3]

$$M_r = \frac{M}{0.8319}$$

$$S_r = \frac{S}{0.4936}$$

According to Equations 2 and 3, LMS signal generation unit 120 may generate an LMS cone signal LrMrSr by dividing Lr, Mr, and Sr signals obtained by multiplying the LMS generation matrix by the Xr, Yr, and Zr signals, respectively, by predetermined conversion values. Here, the conversion values may be 0.9993, 0.8319, and 0.4936 as in Equation 3. Therefore, the generated LMS cone signal may have a signal value ranging from 0 to 1. The generated LMS cone signal may be a linear LMS cone signal.

The signal conversion unit 130 may convert the linear LMS cone signal into a nonlinear LMS cone signal. Accordingly, the signal conversion unit 130 may use an exponential function. For example, as in Equation 4 below, the signal conversion unit 130 may convert the linear LMS cone signal LrMrSr into a nonlinear LMS cone signal L'rM'rS'r using an exponential function wherein an exponent is 0.34.

$$L_r' = L_r^{0.34}$$

$$M_r' = M_r^{0.34}$$

$$S_r' = S_r^{0.34}$$ [Equation 4]

The matrix generation unit 140 may generate a conversion matrix using a degree of correlation and a difference of lightness, that is, peak signal to noise ratio (PSNR)-lightness. The degree of correlation is computed from three pairs of the signals formed by lightness and chrominance signal combinations that are obtained using the candidate conversion matrix in Equation 6. More specifically, the matrix generation unit 140 may generate the candidate conversion matrix using the correlation degree of the nonlinear LMS cone signal and determine the candidate conversion matrix generated using the PSNR-lightness as the conversion matrix.

Figure 4:
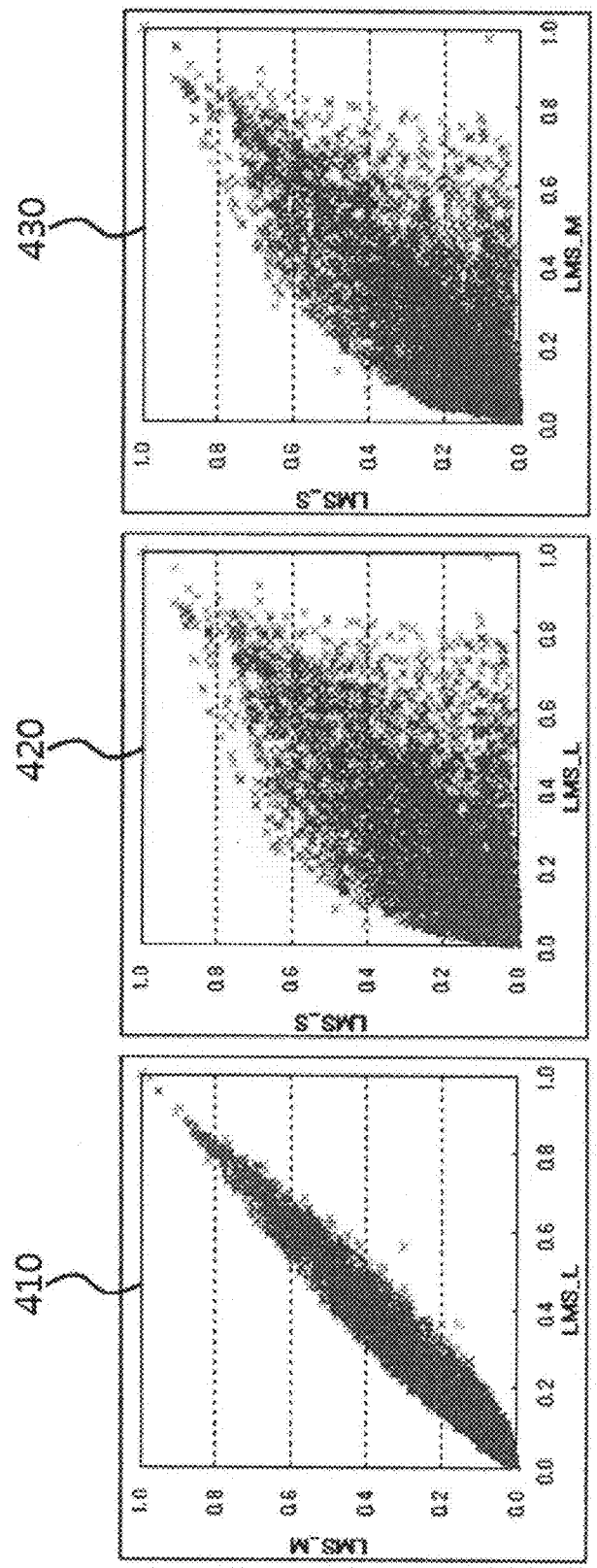
FIG. 4 is a diagram illustrating a degree of correlation of a nonlinear LMS cone signal.

For example, the matrix generation unit 140 may generate the candidate conversion matrix including coefficients where the correlation degree of the nonlinear LMS cone signal is not greater than a predetermined reference value. The reference value may be 0.5. The correlation degrees according to combination of the L signal, the M signal, and the S signal may be as illustrated in FIG. 4.

Additionally, the matrix generation unit 140 may calculate a lightness value of an image formed by sub-sampling the chrominance signal and a lightness value of the input image. The matrix generation unit 140, in the calculation, may use the PSNR-lightness which is a difference of lightness between the input image and the image formed by sub-sampling the chrominance signal. Here, when the PSNR-lightness has an approximate value of 0 within a predetermined reference range, in other words, when the difference of lightness between the input image and the sub-sampled image is approximately 0, the matrix generation unit 140 may determine the generated candidate conversion matrix as the conversion matrix.

Here, the chrominance signal may be generated using the candidate conversion matrix. For example, the matrix generation unit 140 may calculate the lightness difference (PSNR-lightness) using Equation 5 as follows.

$$PSNR = 10\log_{10}\left(\frac{MAX_I^2}{MSE}\right)$$ [Equation 5]

$$MSE = \frac{1}{mn}\sum_{i=0}^{m-1}\sum_{j=0}^{n-1}[I(i,j) - K(i,j)]^2$$

In Equation 5, MSE denotes a mean square error, m denotes the number of horizontal pixels constituting an image, n denotes the number of vertical pixels constituting the image, I(i,j) denotes a lightness value in each pixel of the input image, and K(i,j) denotes a lightness value in each pixel of the image formed by sub-sampling the chrominance signal. MAX may be a maximum lightness value or be set to an arbitrary large number such as 10,000. Here, the PSNR-lightness represents a degree of distortion of a lightness component of the image as a result of contrast of the input image. That is, as the PSNR-lightness is small, the distortion degree is great and, as the PSNR-lightness is great, the distortion degree is small.

The lightness signal generation unit 150 may generate the lightness signal using the determined conversion matrix and the nonlinear LMS cone signal. For example, as shown in Equation 6 below, a lightness signal A may be generated by combining the L signal, the M signal, and the S signal constituting the nonlinear LMS cone signal.

$$\begin{bmatrix} A \\ C_{YB} \\ C_{RG} \end{bmatrix} = M\begin{bmatrix} L_r' \\ M_r' \\ S_r' \end{bmatrix} = \begin{bmatrix} M_{11} & M_{12} & M_{13} \\ M_{21} & M_{22} & M_{23} \\ M_{31} & M_{32} & M_{34} \end{bmatrix}\begin{bmatrix} L_r' \\ M_r' \\ S_r' \end{bmatrix}$$ [Equation 6]

In Equation 6, A denotes the lightness signal, $C_{YB}$ denotes a yellow-blue chrominance signal, $C_{RG}$ denotes a red-green chrominance signal, M denotes the conversion matrix, and L'r, M'r, and S'r respectively denote the L, M, and S signals constituting the nonlinear LMS cone signal. Here, the lightness signal may include only lightness information or include lightness information and chrominance information having an approximate value of 0. When the chrominance information has the approximate value of 0, minimum chrominance information included in the lightness signal is negligible. That is, the chrominance information included in the lightness signal is significantly minor that variation of the lightness signal does not influence the chrominance information.

According to Equation 6, the lightness signal generation unit 150 may generate the lightness signal A by multiplying coefficients $M_{11}$, $M_{12}$, and $M_{13}$ of the conversion matrix by the L signal, the M signal, and the S signal, respectively. Here, since the $M_{11}$, $M_{12}$, and $M_{13}$ may all have the same sign, the lightness signal A may be generated by combining the L signal, the M signal, and the S signal.

For example, a matrix $$M = \begin{bmatrix} 65.5738 & 32.7869 & 1.6393 \\ -38.9100 & 66.6938 & -27.7838 \\ 141.6340 & -128.6958 & -12.9382 \end{bmatrix}$$

may be applied to Equation 6 as the conversion matrix M.

The chrominance signal generation unit 160 may generate the chrominance signal using the determined conversion matrix and the nonlinear LMS cone signal. Here, the chrominance signal generated may include only chrominance signal or include chrominance information and lightness information having an approximate value of 0. Here, when the lightness information has the approximate value of 0, minimum lightness information included in the chrominance signal is negligible. That is, the lightness information included in the chrominance signal is so minor that variation of the chrominance signal caused by sub-sampling and the like does not influence the lightness information.

According to Equation 6 above, the chrominance signal generation unit 160 may generate a chrominance signal $C_{YB}$ by multiplying coefficients $M_{21}$, $M_{22}$, and $M_{23}$ of the conversion matrix by the L signal, the M signal, and the S signal, respectively. Here, at least one of the $M_{21}$, $M_{22}$, and $M2_3$ may have a different sign from the others. In other words, the chrominance signal generation unit 160 may generate the chrominance signals $C_{YB}$ and $C_{RG}$ by separating the nonlinear LMS cone signal using the conversion matrix M of Equation 6 such that at least one of the L signal, the M signal, and the S signal have a different sign.

Figure 7:
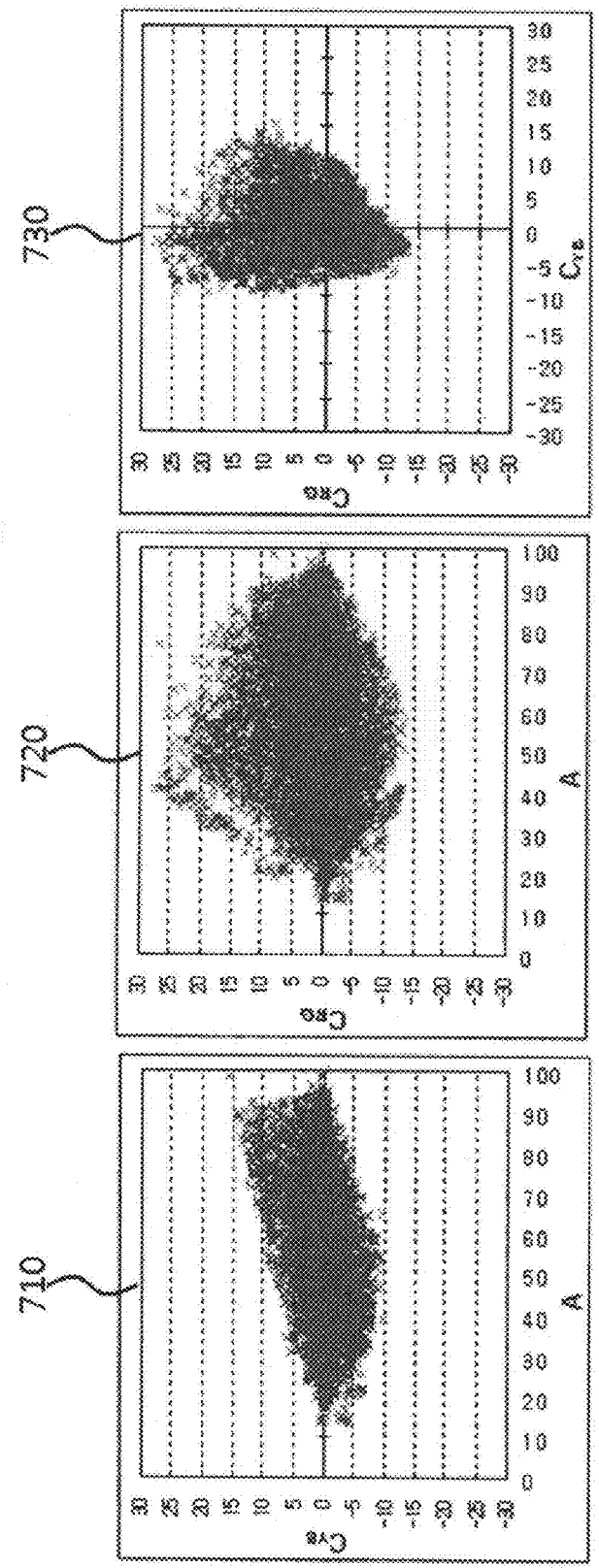
FIG. 7 is a diagram illustrating a degree of correlation between a lightness signal and a chrominance signal generated using an LMS cone signal.

Accordingly, the correlation degree between the lightness signal and the chrominance signal generated according to Equation 6 may be equal to or smaller than the predetermined reference value. That is, the chrominance signal generation unit 160 may generate the chrominance signal such that the correlation degree between the lightness signal and the chrominance signal is not greater than the predetermined reference value. For example, when the reference value is set to 0.5, the correlation degree between the lightness signal and the chrominance signal may be as shown in FIG. 7. Referring to FIG. 7, as the correlation degrees of a signal formed by combining the red-green chrominance signal $C_{RG}$ with the lightness signal A and of a signal formed by combining the yellow-blue chrominance signal $C_{YB}$ with the lightness signal A are not greater than 0.5, characteristics of correlations between the lightness signal and the chrominance signal may be reduced. That is, while the correlation degree of the nonlinear LMS cone signal is relatively high as shown in FIG. 4, the correlation degree of the lightness signal and the chrominance signal $AC_{YB}C_{RG}$ is relatively low as shown in FIG. 7.

The digital conversion unit 170 may convert the lightness signal and the chrominance signal into digital signals. The digitized lightness signal and chrominance signal may each have a positive number value. For example, the digital conversion unit 170 may digitize the lightness signal and the chrominance signal using Equation 7 below.

$$DA = (219 \times A + 16) \times 2^{n-8}$$

$$DC_{YB} = \{224 \times [(C_{YB} + 16.4685)/31.9526 - 0.5] + 128\} \times 2^{n-8}$$

$$DC_{RG} = \{224 \times [(C_{RG} + 12.6596)/41.6184 - 0.5] + 128\} \times 2^{n-8} \quad \text{[Equation 7]}$$

In Equation 7, DA denotes the digitized lightness signal, $DC_{YB}$ denotes the digitized yellow-blue chrominance signal, and $DC_{RG}$ denotes the digitized red-green chrominance signal, and n denotes a bit-depth. The bit-depth n may be any one of 8, 10, 12, and 14.

The subsampling unit 180 may sub-sample the digitized chrominance signal. As shown in FIG. 5, the sub-sampling unit 180 may sub-sample the digitized chrominance signal using at least one of a 4:2:0 sub-sampling 510, a 4:1:0 sub-sampling 520, and a 16:1:0 sub-sampling 530. For example, in case of using the 4:2:0 sub-sampling, the sub-sampling unit 180 may averagely sub-sample 4 pixels out of pixels constituting the digitized chrominance signal into one chrominance signal.

The compression unit 190 may compress the digitized lightness signal and the sub-sampled chrominance signal. Therefore, the compression unit 190 may transmit a compressed image to a video signal restoration apparatus 800. Here, the compressed image may include the digitized lightness signal and the sub-sampled chrominance signal.

Figure 2:
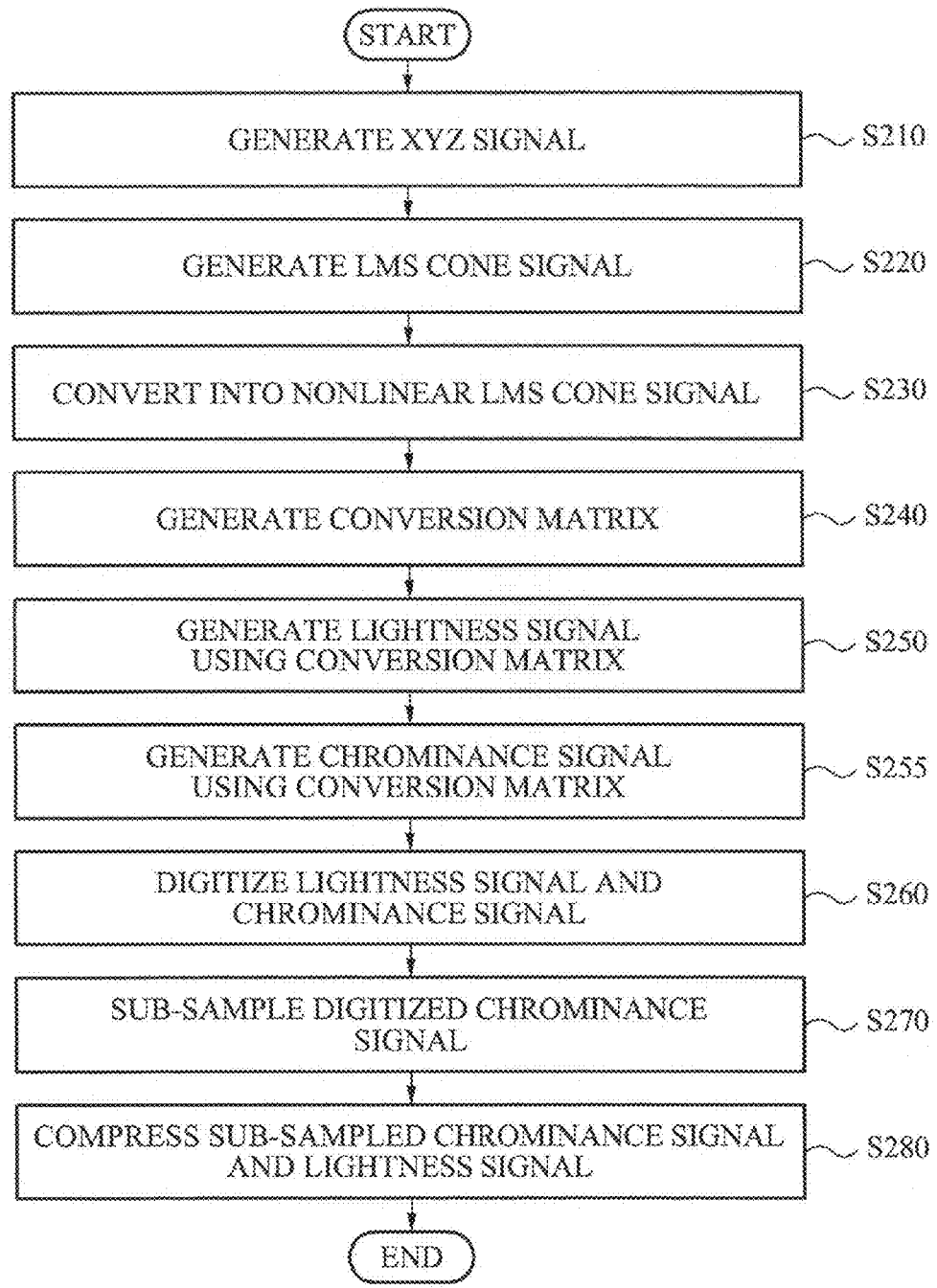
FIG. 2 is a flowchart illustrating an operation of the video signal generation apparatus of FIG. 1.

FIG. 2 is a flowchart illustrating an operation of the video signal generation apparatus 100 of FIG. 1.

Referring to FIG. 2, the XYZ signal generation unit 110 may generate the XYZ signal from the input image, in operation 210.

For example, the XYZ signal generation unit 110 may convert the RGB value of the input image into the XYZ signal according to 1931 Commission Internationale de l'Eclairage (CIE) color matching functions. Next, the LMS signal generation unit 120 may generate the LMS cone signal from the input image in operation 220.

For example, the LMS signal generation unit 120 may generate the LMS cone signal by separating the L signal, the M signal, and the S signal from the XYZ signal generated using the LMS generation matrix. Here, the LMS signal generation unit 120 may generate the L, M, and S signals from the XYZ signal using Equation 2. In addition, the LMS signal generation unit 120 may generate the LMS cone signal LrMrSr by dividing the separated L, M, and S signals by conversion values, respectively as shown in Equation 3. The LMS cone signal generated may be the linear LMS cone signal.

The signal conversion unit 130 may convert the linear LMS cone signal into the nonlinear LMS cone signal in operation 230. The signal conversion unit 130 may use an exponential function in the conversion.

The matrix generation unit 140 may generate the conversion matrix M using the correlation degree and the PSNR-lightness in operation 240.

The lightness signal generation unit 150 may generate the lightness signal using the generated conversion matrix M and the nonlinear LMS cone signal in operation 250.

Here, the lightness signal generation unit 150 may generate the lightness signal A by combining the L signal, the M signal, and the S signal constituting the nonlinear LMS cone signal. For example, the lightness signal generation unit 150 may generate the lightness signal A by multiplying the coefficients $M_{11}$, $M_{12}$, and $M_{13}$ of the conversion matrix by the L signal, the M signal, and the S signal, respectively, using Equation 6. Thus-generated lightness signal may include only lightness information or include lightness information and chrominance information having an approximate value of 0.

In the similar manner, the chrominance signal generation unit 160 may generate the chrominance signal using the conversion matrix M and the nonlinear LMS cone signal in operation 255.

Here, the chrominance signal generation unit 160 may generate the chrominance signals $C_{YB}$ and $G_{RG}$ by separating the nonlinear LMS cone signal such that at least one of the L signal, the M signal, and the S signal constituting the nonlinear LMS cone signal has a different sign from the others. For example, the chrominance signal generation unit 160 may generate the yellow-blue chrominance signal $C_{YB}$ by multiplying the coefficients $M_{21}$, $M_{22}$, and $M_{23}$ of the conversion matrix by the L signal, the M signal, and the S signal, respectively, and also generate the red-green chrominance signal $C_{RG}$ by multiplying coefficients $M_{31}$, $M_{32}$, and $M_{33}$ by the L signal, the M signal, and the S signal, respectively. Therefore, the chrominance signals $C_{YB}$ and $C_{RG}$ may include only the chrominance information or include the chrominance information and the lightness information having an approximate value of 0.

Next, the digital conversion unit 170 may convert the chrominance signal and the lightness signal into digital signals in operation 260. The digitized chrominance signal and lightness signal may each have a positive number value.

The sub-sampling unit 180 may sub-sample the digitized chrominance signal in operation 270.

The sub-sampling unit 180 may averagely sub-sample chrominance signals of a plurality of pixels into one chrominance signal. For example, the sub-sampling unit 180 may sub-sample the digitized chrominance signals using at least one of a 4:2:0 sub-sampling, a 4:1:0 sub-sampling, and a 16:1:0 sub-sampling.

The compression unit 190 may generate a compressed image by compressing the sub-sampled chrominance signal and the digitized lightness signal in operation 280. The compression unit 190 may transmit the compressed image to the video signal restoration apparatus 800.

Figure 8:
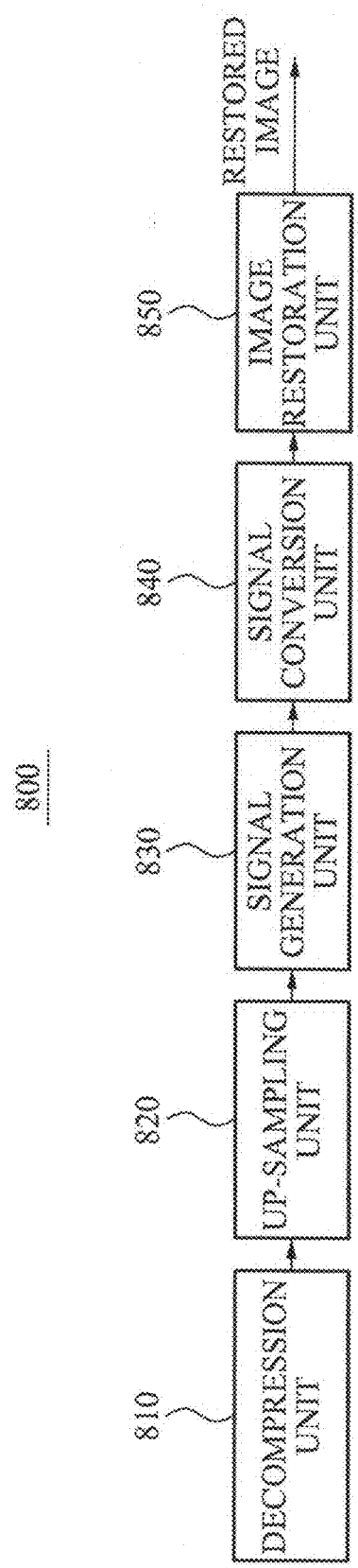
FIG. 8 is a block diagram illustrating a structure of a video signal restoration apparatus.

FIG. 8 is a block diagram illustrating a structure of the video signal restoration apparatus 800.

Referring to FIG. 8, the video signal restoration apparatus 800 may include a decompression unit 810, an up-sampling unit 820, a signal generation unit 830, a signal conversion unit 840, and an image restoration unit 850.

The decompression unit 810 may decompress the compressed image received from the video signal generation apparatus 100. The compressed image may include the lightness signal compressed by the video signal generation apparatus 100 and the chrominance signal compressed and sub-sampled by the video signal generation apparatus 100. The decompression unit 810 may decompress the compressed image, thereby restoring the lightness signal and the sub-sampled chrominance signal. Here, the lightness signal and the sub-sampled chrominance signal may be the lightness signal and the chrominance signal generated using the LMS cone signal.

The up-sampling unit 820 may restore the chrominance signal by up-sampling the sub-sampled chrominance signal. Here, the up-sampling unit 820 may perform interpolation during the up-sampling.

For example, the up-sampling unit 820 may restore the chrominance signal using bicubic interpolation. The bicubic interpolation is a method of restoring a chrominance signal of a block to be restored, using chrominance signals of 8 neighboring pixel blocks.

The signal generation unit 830 may restore the nonlinear LMS cone signal by inverting the restored lightness signal and chrominance signal.

For example, the signal generation unit 830 may restore the nonlinear LMS cone signal by multiplying an inverse matrix $M^{-1}$ by the lightness signal and the chrominance signal as shown in Equation 8 below. The inverse matrix $M^{-1}$ may be an inverse matrix of the conversion matrix M used in Equation 6 hereinabove.

$$\begin{bmatrix} RL'_r \\ RM'_r \\ RS'_r \end{bmatrix} = M^{-1} \begin{bmatrix} RA \\ RC_{YB} \\ RC_{RG} \end{bmatrix} = \begin{bmatrix} M_{11} & M_{12} & M_{13} \\ M_{21} & M_{22} & M_{23} \\ M_{31} & M_{32} & M_{34} \end{bmatrix}^{-1} \begin{bmatrix} RA \\ RC_{YB} \\ RC_{RG} \end{bmatrix} \quad \text{[Equation 8]}$$

In Equation 8, RA denotes the restored lightness signal, the $RC_{YB}$ denotes the restored yellow-blue chrominance signal, $RC_{RG}$ denotes the restored red-green chrominance signal, $M^{-1}$ denotes the inverse matrix, the RL'r denotes a restored L signal, RM'r denotes a restored M signal, and RS'r denotes a restored S signal. Here, the restored nonlinear LMS cone signal may include the restored L, M and S signals.

The signal conversion unit 840 may convert the restored nonlinear LMS cone signal into a linear LMS cone signal using an exponential function. For example, when the linear LMS cone signal LrMrSr is converted into the nonlinear LMS cone signal L'rM'rS'r using an exponential function where the exponent is 0.34, the signal conversion unit 840 may convert the restored nonlinear LMS cone signal into the linear LMS cone signal using an exponential function where the exponent is 1/0.34.

The image restoration unit 850 may restore the XYZ signal by normalizing the liner LMS cone signal.

Figure 6:
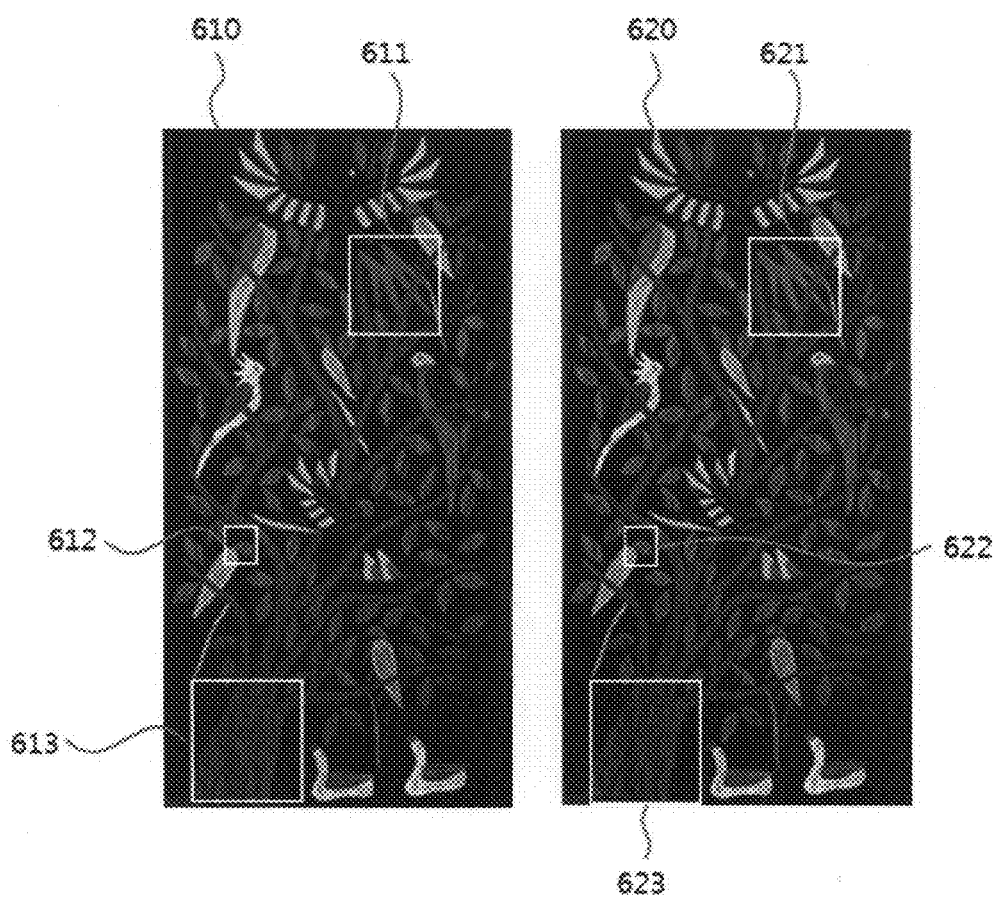
FIG. 6 is a diagram comparing image qualities of an input image and a restored image.

In addition, the image restoration unit 850 may restore the input image by converting the restored XYZ signal into an RGB signal according to 1931 Commission Internationale de l'Eclairage (CIE) color matching functions. Thus, when the LMS cone signal is used, deterioration of quality of the restored image 620 from the input image 610 is minor as a result of comparison between fine texture regions 611 to 613 and fine texture regions 621 to 623, as shown in FIG. 6

For example, when the lightness signal and the chrominance signal generated using the LMS cone signal are used, the lightness difference (PSNR-lightness) between the input image and the restored image is 59. In addition, when the input image is restored using the lightness signal and the chrominance signal of Standard ITU-R BT.709, the PSNR-lightness is 39. Thus, it is confirmed that distortion of the store image with respect to the input image is reduced when the LMS cone signal is used for the image restoration. Here, as the PSNR-lightness becomes smaller, distortion of lightness components of the restored input image becomes greater.

Figure 9:
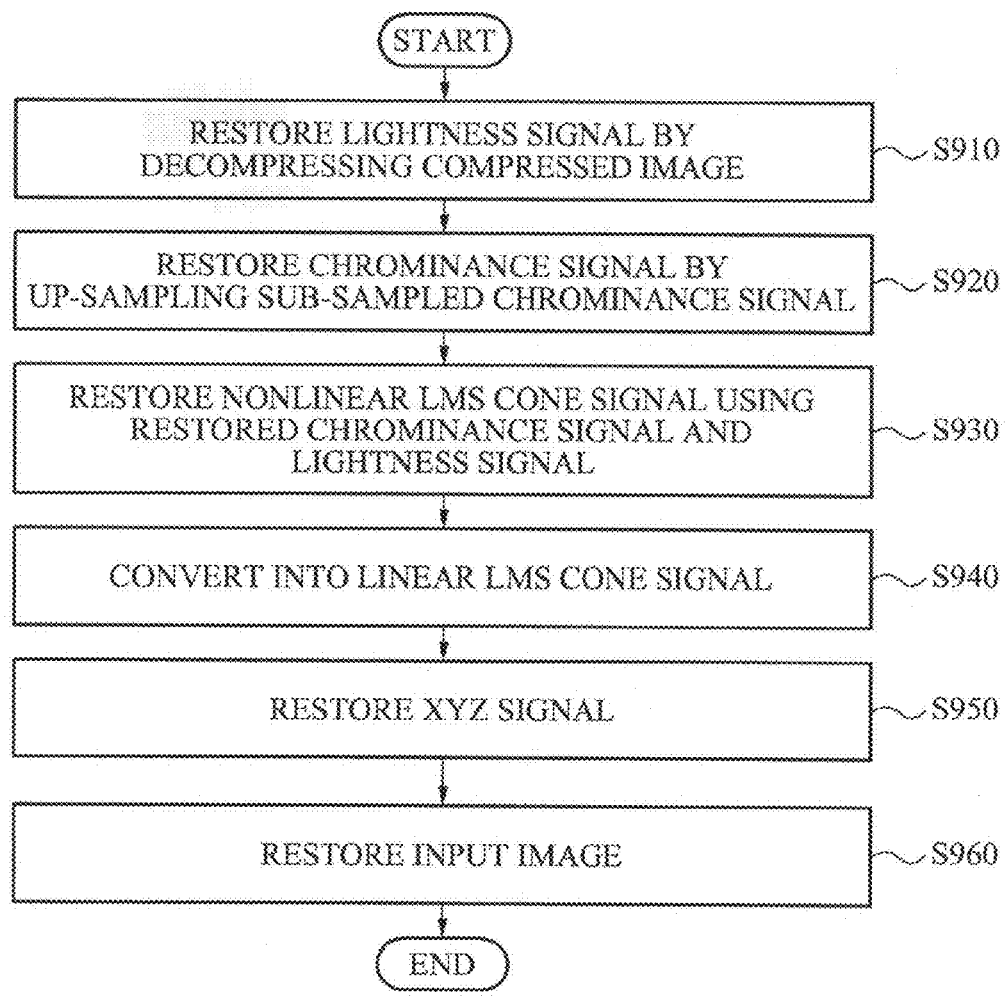
FIG. 9 is a flowchart illustrating an operation of a video signal restoration apparatus.

FIG. 9 is a flowchart illustrating an operation of the video signal restoration apparatus of FIG. 8.

Referring to FIG. 9, the decompression unit 810 may restore the lightness signal by decompressing the compressed image in operation 910. Here, the decompression unit 810 may also restore the sub-sampled chrominance signal through the decompression.

Next, the up-sampling unit 820 may restore the chrominance signal by up-sampling the sub-sampled chrominance signal in operation 920. During the up-sampling, the up-sampling unit 820 may restore the chrominance signal by performing interpolation along with the up-sampling.

The signal generation unit 830 may restore the nonlinear LMS cone signal using the restored chrominance signal and the restored lightness signal in operation 930. Here, the signal generation unit 830 may restore the nonlinear LMS cone signal using the inverse matrix $M^{-1}$.

Next, the signal conversion unit 840 may convert the nonlinear LMS cone signal into the linear LMS cone signal using an exponential function in operation 940.

In addition, the image restoration unit 850 may restore the XYZ signal by normalizing the converted linear LMS cone signal in operation 950.

Next, the image restoration unit 850 may restore the input image by converting the restored XYZ signal into the RGB signal in operation 960. For example, the image restoration unit 850 may use 1931 Commission Internationale de l'Eclairage (CIE) color matching functions.

For convenience of description, the video signal generation apparatus 100 has been explained to include the sub-sampling unit 180 and the compression unit 190 with reference to FIGS. 1 and 2. That is, at least one of the sub-sampling unit 180 and the compression unit 190 may be omitted from the video signal generation unit 100.

For example, in a case where the image is transmitted without compression, the compression unit 190 may be omitted from the video signal generation apparatus 100. That is, operation 280 of FIG. 2 may be omitted. Therefore, the sub-sampling unit 180 may transmit the image including the sub-sampled chrominance signal and the digitized lightness signal to the video signal restoration apparatus 800. Thus, K(i,j) of Equation 5 may represent a lightness value at each pixel position of the image including the sub-sampled chrominance signal and the digitized lightness signal.

For another example, when the image is transmitted without sub-sampling, the sub-sampling unit 180 may be omitted from the video signal generation apparatus 100. That is, operation 270 of FIG. 2 may be omitted. Therefore, the compression unit 190 may compress the digitized lightness signal and the digitized chrominance signal and transmit the compressed signals to the video signal restoration apparatus 800. Thus, K(i,j) of Equation 5 may represent a lightness value at each pixel position of the image compressed without sub-sampling.

For another example, when the image is transmitted without being compressed nor sub-sampled, the sub-sampling unit 180 and the compression unit 190 may both be omitted. That is, operations 270 and 280 of FIG. 2 may be omitted. Therefore, the digital conversion unit 170 may transmit the image including the digitized lightness signal and the digitized chrominance signal to the video signal restoration apparatus 800. Thus, the K(i,j) of Equation 5 may represent a lightness value at each pixel position of the image including the digitized lightness signal and the digitized chrominance signal.

Similarly, the video signal restoration apparatus 800 of FIG. 8 may omit at least one of the decompression unit 810 and the up-sampling unit 820.

For example, when the compression unit 190 is omitted from the video signal generation apparatus 100, the decompression unit 810 may be omitted from the video signal restoration unit 800. Also, when the sub-sampling unit 180 is omitted from the video signal generation apparatus 100, the up-sampling unit 820 may be omitted from the video signal restoration apparatus 800. When both of the sub-sampling unit 180 and the compression unit 190 are omitted from the video signal generation apparatus 100, the decompression unit 810 and the up-sampling unit 820 may both be omitted from the video signal restoration unit 800.

Thus, according to a method of generating a video signal in accordance with an embodiment, lightness signals and chrominance signals can be generated such uncorrelation property between the lightness signals and the chrominance signals may be maximized and a difference in the lightness between an original input image and a result image is minimized. Therefore, variation of the chrominance signals does not influence the lightness signals. As a consequence, a crosstalk between the light signal and the chrominance signal may be minimized.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files including higher level code that may be executed by the computer using an interpreter. The described hardware devices may be configured to act as one or more software modules in order to perform the operations and methods described above, or vice versa.

Any one or more of the software modules described herein may be executed by a dedicated computer or processor unique to that unit or by computer or a processor common to one or more of the modules. The described methods may be executed on a general purpose computer or processor or may be executed on a particular machine such as the processor supporting a video signal generation apparatus and/or a video signal restoration apparatus described herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A video signal generation apparatus comprising:
a LMS signal generation unit to generate a long medium short (LMS) cone signal from an input image;
a signal conversion unit to convert the LMS cone signal into a nonlinear LMS cone signal by using an exponential function;
a lightness signal generation unit to generate a lightness signal using the nonlinear LMS cone signal; and
a chrominance signal generation unit to generate a chrominance signal using the nonlinear LMS cone signal,
wherein a statistical dependence, computed for the input image, between the lightness signal and the chrominance signal is below a predetermined threshold.

2. The video signal generation apparatus of claim 1, wherein the signal conversion unit converts the LMS cone signal into a nonlinear LMS cone signal by raising the value of each of an L signal, an M signal, and an S signal constituting the LMS cone signal to the power of a predetermined exponent.

3. The video signal generation apparatus of claim 1, wherein the lightness signal generation unit generates the lightness signal by combining an L signal, an M signal, and an S signal constituting a nonlinear LMS cone signal.

4. The video signal generation apparatus of claim 1, wherein the chrominance signal generation unit generates the chrominance signal by separating a nonlinear LMS cone signal such that at least one of an L signal, an M signal, and an S signal of the nonlinear LMS cone signal has a different sign from the others.

5. The video signal generation apparatus of claim 1, wherein the lightness signal generation unit generates the lightness signal including only lightness information or including the lightness information and chrominance information which has an approximate value of 0, using a nonlinear LMS cone signal.

6. The video signal generation apparatus of claim 1, wherein the chrominance signal generation unit generates the chrominance signal including only chrominance information or including the chrominance information and lightness information which has an approximate value of 0, using a nonlinear LMS cone signal.

7. The video signal generation apparatus of claim 1, wherein the chrominance signal generation unit generates the chrominance signal such that a correlation between the lightness signal and the chrominance signal generated is smaller than a predetermined reference value.

8. The video signal generation apparatus of claim 1, further comprising a sub-sampling unit to sub-sample the generated chrominance signal.

9. The video signal generation apparatus of claim 8, further comprising a compression unit to compress the sub-sampled chrominance signal and the generated lightness signal.

10. A video signal generation method comprising:
generating, by a processor, a long medium short (LMS) cone signal from an input image;
converting, by the processor, the LMS cone signal into a nonlinear LMS cone signal by using an exponential function;
generating, by the processor, a lightness signal using the nonlinear LMS cone signal; and
generating, by the processor, a chrominance signal using the nonlinear LMS cone signal,
wherein a statistical dependence, computed for the input image, between the lightness signal and the chrominance signal is below a predetermined threshold.

11. The video signal generation method of claim 10, further comprising:
converting the LMS cone signal into a nonlinear LMS cone signal by raising the value of each of an L signal, an M signal, and an S signal constituting the LMS cone signal to the power of a predetermined exponent.

12. The video signal generation method of claim 10, wherein the lightness signal generation comprises generating the lightness signal by combining an L signal, an M signal, and an S signal constituting a nonlinear LMS cone signal.

13. The video signal generation method of claim 10, wherein the chrominance signal generation comprises generating the chrominance signal by separating a nonlinear LMS cone signal such that at least one of an L signal, an M signal, and an S signal of the nonlinear LMS cone signal has a different sign from the others.

14. The video signal generation method of claim 10, wherein the lightness signal generation comprises generating the lightness signal including only lightness information or including the lightness information and chrominance information which has an approximate value of 0, using a nonlinear LMS cone signal.

15. The video signal generation method of claim 10, wherein the chrominance signal generation comprises generating the chrominance signal including only chrominance information or including the chrominance information and lightness information which has an approximate value of 0, using a nonlinear LMS cone signal.

16. The video signal generation method of claim 10, wherein the chrominance signal generation comprises generating the chrominance signal such that a correlation between the lightness signal and the chrominance signal generated is smaller than a predetermined reference value.

17. The video signal generation method of claim 10, further comprising sub-sampling the generated chrominance signal.

18. The video signal generation method of claim 17, further comprising compressing the sub-sampled chrominance signal and the generated lightness signal.

19. A video signal restoration apparatus comprising:
an up-sampling unit to restore a chrominance signal by up-sampling a sub-sampled chrominance signal;
a signal generation unit to generate a long medium short (LMS) cone signal using the restored chrominance signal, a lightness signal, and an inverse matrix; and
an image restoration unit to restore the input image using the LMS cone signal,
wherein the inverse matrix is an inverse of a matrix which converts a nonlinear LMS cone signal computed from an input image into a the lightness signal and a chrominance signal,
wherein the chrominance signal is used to create the sub-sampled chrominance signal,
wherein a statistical dependence, computed for the input image, between the lightness signal and the chrominance signal is below a predetermined threshold.

20. The video signal restoration apparatus of claim 19, further comprising a signal conversion unit to convert a generated nonlinear LMS cone signal into a linear LMS cone signal using the restored chrominance signal and the lightness signal,
wherein the image restoration unit restores the input image using the linear LMS cone signal.

21. The video signal restoration apparatus of claim 19, further comprising a decompression unit to decompress a compressed signal of the sub-sampled chrominance signal and the lightness signal,
wherein the up-sampling unit restores the chrominance signal by up-sampling the decompressed chrominance signal.

22. The video signal restoration apparatus of claim 19, wherein
the sub-sampled chrominance signal includes only chrominance information or includes the chrominance information and lightness information having an approximate value of 0, and
the lightness signal includes only lightness information or includes the lightness information and chrominance information having an approximate value of 0.

23. A video signal restoration method comprising:
restoring, by a processor, a chrominance signal by up-sampling a sampled chrominance signal;
generating, by the processor, a long medium short (LMS) cone signal using the restored chrominance signal, a lightness signal, and an inverse matrix; and
restoring, by the processor, an input image using the LMS cone signal,
wherein the inverse matrix is an inverse of a matrix which converts a nonlinear LMS cone signal computed from an input image into a the lightness signal and a chrominance signal,
wherein the chrominance signal is used to create the sub-sampled chrominance signal,
wherein a statistical dependence, computed for the input image, between the lightness signal and the chrominance signal is below a predetermined threshold.

24. The video signal restoration method of claim 23, further comprising converting, into a linear LMS cone signal, a nonlinear LMS cone signal generated using the restored chrominance signal and the lightness signal,
wherein the restoration of the input image is performed by restoring the input image using the linear LMS cone signal.

25. The video signal restoration method of claim 23, further comprising decompressing a compressed signal of the sub-sampled chrominance signal and the lightness signal,
   wherein the restoration of the chrominance signal is performed by up-sampling the decompressed chrominance signal.

* * * * *

UNITED STATES PATENT AND TRADEMARK OFFICE
CERTIFICATE OF CORRECTION

PATENT NO. : 8,885,104 B2
APPLICATION NO. : 13/137290
DATED : November 11, 2014
INVENTOR(S) : Seo Young Choi et al.

Page 1 of 1

It is certified that error appears in the above-identified patent and that said Letters Patent is hereby corrected as shown below:

In the Claims

Column 14, Line 14, in Claim 19, delete "a the" and insert -- the --, therefor.
Column 14, Line 54, in Claim 23, delete "a the" and insert -- the --, therefor.

Signed and Sealed this
Thirtieth Day of June, 2015

Michelle K. Lee
*Director of the United States Patent and Trademark Office*